Patented Feb. 3, 1953

2,627,469

UNITED STATES PATENT OFFICE 2,627,469

SOYA BEAN OIL COMPOSITIONS

Daniel Melnick, Teaneck, N. J., Chester M. Gooding, Staten Island, N. Y., and Hans W. Vahlteich, Englewood, N. J., assignors to The Best Foods, Inc., New York, N. Y., a corporation of New Jersey No Drawing. Application January 29, 1952, Serial No. 268,935

29 Claims. (Cl. 99—144)

This invention relates to soya bean oil and more particularly to a hydrogenated and winterized soya bean oil in combination with a vegetable salad oil having an iodine number of less than 120 for use as a salad oil such as that usable in mayonnaise.

The present application is a continuation-in-part of our earlier application Serial No. 216,100, filed March 16, 1951.

Mayonnaise can readily withstand temperatures as low as 50° F. However, on those occasions when the housewife lowers the temperature of the refrigerator for making frozen desserts, for example, oil emulsion failure occurs with ensuing oil separation of mayonnaise stored under such conditions. In the winter months, low temperatures encountered in shipping and storage have frequently been responsible for oil separation. To overcome this defect, corn oil has been used as a substitute for cottonseed or other salad oil in mayonnaise, but aside from the limited available supply of corn oil, corn oil does not possess the desired degree of flavor stability to warrant its extensive use for this purpose, especially during grocery shelf storage at summer temperatures. Refined soya bean oil is sometimes used as a means of avoiding emulsion failure due to freezing, but such soya bean oil has only limited value in this respect and reverts in flavor to render substantially impossible its use in quality mayonnaise.

It is an object of the present invention to provide a salad oil exhibiting unexpected cold resistance by itself and particularly when the salad oil is incorporated into mayonnaise.

It is another object of the invention to provide a salad oil imparting superior emulsion stability to mayonnaise produced from the salad oil composition.

It is a further object of the invention to provide a salad oil composition and a mayonnaise prepared from the said salad oil, both having improved flavor characteristics and stability.

It is a still further object of the invention to provide a mayonnaise having desired color elegance and stability, desired firmness in texture and the ability to absorb added aqueous components without a disruption of the emulsion characteristics.

It will be apparent from the disclosure which follows that the above objects have been accomplished by the present invention. Further objects and advantages of the invention will be apparent and will be explained in connection with the description which follows.

In accordance with this invention, a salad oil is provided comprising a vegetable salad oil having an iodine number of less than 120 and a hydrogenated and winterized soya bean oil having an iodine number of 100 to 120 and containing less than 5% of conjugated dienoic components, less than 0.2% of conjugated trienoic components and less than 0.02% of conjugated tetraenoic acid components. The preparation, properties, and utility features of the hydrogenated winterized soya bean oils have been disclosed in our copending U. S. patent applications (Vahlteich, Gooding and Melnick, S. N. 216,100 and Gooding, S. N. 216,099). When the oil blends of this invention are used as the oil component of mayonnaise, they produce a mayonnaise which has a marked freeze resistance and emulsion stability, equal to that prepared from corn oil, and better flavor stability than a quality mayonnaise such as that prepared from cottonseed salad oil. The resulting mayonnaise differs from mayonnaise made with corn oil in having markedly superior flavor stability, and from a mayonnaise made with cottonseed oil in having markedly superior emulsion stability. In other words, the oil blends of this invention combine the best properties of the two types of oils, hitherto used on a seasonal basis, so that one oil formulation can now be used successfully all year round in the manufacture of quality mayonnaise.

The salad oil of this invention is an edible glyceridic oil composition comprising desirably 25 to 75% of a vegetable salad oil having an iodine value of less than 120 and 25 to 75% of a hydrogenated winterized soya bean oil having an iodine value of 100 to 120 and preferably 110 to 120. The preferable compositions of the salad oil comprise 40 to 60% of a vegetable salad oil having an iodine value of less than 120 and 40 to 60% of a hydrogenated winterized soya bean oil having an iodine value of 100 to 120 and preferably 110 to 120. Optimum compositions of the salad oil comprise a 50-50% mixture of the soya bean oil and the vegetable salad oil. The hydrogenated and winterized soya bean oil contains less than 5% and preferably less than 3.5% or 1.0% of conjugated dienoic acid components, less than 0.2% and preferably less than 0.1% of conjugated trienoic acid components; and less than 0.02%, and preferably less than 0.015% of conjugated tetraenoic acid components. The most desirable hydrogenated winterized soya bean oils for use according to the invention contain less than 0.8% of conjugated dienoic acid components, less than 0.02% or 0.015% of conjugated trienoic acid components and less than 0.002% of conjugated tetraenoic acid components. The amounts of conjugated components in the hydrogenated oil are determined by the method according to B. A. Brice et al. in Oil and Soap, XXII, 219 (1945).

The vegetable salad oil may be a mixture of two or more vegetable oils and makes up the difference between the soya bean oil used and the total of the glyceridic oil in the composition.

To best illustrate the patentable features of this invention, examples are given of the new salad oils and mayonnaise products prepared therewith.

The mayonnaise examples were produced from the salad oils of this invention by incorporating such an oil with vinegar, egg, salt and other ingredients in the manner ordinarily employed for this spurpose (e. g. in accordance with standard for mayonnaise of the Federal Security Agency, Federal Register, August 12, 1950, pp. 5227-5232). Preferably, however, incorporation of oxygen in the mayonnaise should be avoided by protecting the product during processing, for example, with nitrogen.

In Table I are listed 6 salad oil examples illustrating the synergistic effects noted in cold tests when vegetable salad oils having an iodine value of less than 120 are blended with hydrogenated winterized soya bean oil having an iodine value of 110 to 120. The cold test values for the salad oils were obtained by the Official Method Cc 11-42 of the American Oil Chemists' Society. The examples in the table show the excellent results which may be obtained using hydrogenated winterized soya bean oils having the preferred limits of conjugated unsaturated acid components.

value) with a well winterized salad oil (one with a high cold test value) in order to up-grade the poorer salad oil. Under such circumstances, the cold test on such oils approaches the cold test value of the oil with the poorer resistance to low holding temperatures. For this reason, it is the routine practice in preparing salad oils to return to the winterizing plant all oils low in cold test values for a repetition of the winterization process using such oils in making a marketable salad oil, a mayonnaise, or related products. However, it will be noted from the examples in Table I that a 50:50 blend of winterized cottonseed oil and hydrogenated winterized soya bean oil exhibits a cold test value not approximating the lower value of the two oils, not approximating the average, but one well above the highest figure for the two oils in the blend. This synergistic upgrading of vegetable salad oils having an iodine value of less than 120 and blended with hydrogenated winterized soya bean oil with an iodine value of 110 to 120 and low in concentration of conjugated fatty acids is routinely noted when the two oil components are blended in 50:50 ratio. Even when blended in a ratio of 75 parts of one oil to 25 parts of the other, this synergistic up-grading of the cold test values is noted. The same occurs with vegetable salad oils other than cottonseed oil but also having an iodine value of less than 120; sesame oil and peanut oil are good examples of these other type oils. In the case of some blends (Example 6 in Table I), the cold test value may not exceed the cold test figure of the highest in the blend, although it will be very much greater than the average weighted cold test value for the blend. That synergistic up-

TABLE I

*Synergistic effects noted in cold tests when vegetable salad oils having an iodine value of less than 120 are blended with hydrogenated winterized soya bean oil having an iodine value of 110 to 120*

| Salad Oil Example | Salad Oil Component | Blend | Iodine Value | Conjugated Fatty Acids of Soya Bean Oil | | | Cold Test at 32° F.[1] | |
|---|---|---|---|---|---|---|---|---|
| | | | | Dienoic | Trienoic | Tetraenoic | Individual Oils | Oil Blend |
| | | *Percent* | | *Percent* | *Percent* | *Percent* | *Hours* | *Hours* |
| 1 | Cotton seed | 50 | 113 | | | | 12 | |
| | Soya Bean | 50 | 117 | 0.0 | 0.00 | 0.00 | 18 | 36 |
| 2 | Cottonseed | 25 | 113 | | | | 13 | |
| | Soya Bean | 75 | 118 | 0.4 | 0.014 | 0.00 | 15 | 20 |
| 3 | Cottonseed | 75 | 113 | | | | 13 | |
| | Soya Bean | 25 | 118 | 0.4 | 0.014 | 0.00 | 15 | 21 |
| 4 | Sesame | 60 | 112 | | | | 20 | |
| | Soya Bean | 40 | 112 | 0.6 | 0.012 | 0.001 | 6 | 22 |
| 5 | Cottonseed | 37.5 | 110 | | | | 12 | |
| | Sesame | 25.0 | 114 | | | | 14 | |
| | Soya Bean | 37.5 | 116 | 0.00 | 0.00 | 0.00 | 8 | 22 |
| 6 | Cottonseed | 25 | 115 | | | | 10 | |
| | Sesame | 35 | 113 | | | | 20 | |
| | Peanut | 15 | 92 | | | | 0.25 | 12 |
| | Soya Bean | 25 | 112 | 0.9 | 0.018 | 0.001 | 7 | |

[1] Number of hours required for first appearance of turbidity, i. e. of solid triglycerides.

The oil formulations of the present invention, illustrated by the examples in Table I, have shown the unexpected property of having cold test values far in excess of those anticipated, based upon experiences up to the present time in the preparation of salad oil blends. It is contrary to the teachings of oil technologists to blend a poorly winterized oil (one with a low cold test grading of the cold test value in such blends also occurs is apparent from the very low cold test values of the oil blend prepared without the hydrogenated winterized soya bean oil component. Thus, in the case of Example 6 prepared without the soya bean oil, a cold test value of less than two hours was obtained.

The salad oil examples, given in Table I, are those recommended for sale per se through retail outlets to the housewife. When the hydrogenated winterized soya bean oils in these formulations comprise those having an iodine value of 100 to 110 and/or are characterized by a relatively high concentration of conjugated fatty acids, viz. 5% dienoic, 0.2% trienoic and 0.02% tetraenoic fatty acids, the synergistic upgrading of cold test values is not noted; the cold test values approximate those of the oil in the system with the lowest cold test value. Thus, oil blends containing such hydrogenated winterized soya bean oils may not be employed in the production of a marketable salad oil for sale through retail outlets. Such oils, when stored in the home-refrigerator would show heavy precipitates of solid triglycerides and would therefore be objectionable to the consumer. For preferred salad oil preparations having optimum freeze test properties, it is desirable to use hydrogenated winterized soya bean oils according to the invention having an iodine number of 110 to 120 and a minimum of conjugated unsaturated fatty acids; less than 1.0% of conjugated dienoic acid components; less than 0.02% and preferably less than 0.01% of conjugated trienoic acid components; and less than 0.002% of conjugated tetraenoic acid components.

The salad oils made with hydrogenated winterized soya bean oils having an iodine value of 100 to 110 and containing the relatively larger amounts of conjugated unsaturated fatty acids may be used as a salad oil by a manufacturer of mayonnaise with striking improvements in the quality of his product or that of the prior art. The improvement in freeze resistance is apparent from the illustrative mayonnaise examples listed in Table II. Thus, the salad oils containing the hydrogenated winterized soya bean oils having an iodine value of 100 to 110 with the larger concentrations of conjugated unsaturated fatty acids are no less important than those containing the preferred hydrogenated winterized soya bean oils when the resulting salad oil is used for mayonnaise manufacture. Table II follows:

*Table II*

*Synergistic up-grading of the freeze resistance of mayonnaise samples prepared with vegetable salad oils having an iodine value of less than 120 when blended with hydrogenated winterized soya bean oil having an iodine value of 100 to 120*

| Mayonnaise Example | Salad Oil Component | Blend | Iodine Value | Conjugated Fatty Acids of Soya Bean Oil | | | Cold Test of Oil Blend at 32° F.[1] | Emulsion Stability of Mayonnaise[2] | |
|---|---|---|---|---|---|---|---|---|---|
| | | | | Dienoic | Trienoic | Tetraenoic | | At 25° F. | At 15° F. |
| | | Percent | | Percent | Percent | Percent | Hours | Hours | Hours |
| 1 | Cottonseed | 100 | 113 | | | | 16 | 10 | 5 |
| 2 | Corn | 100 | 127 | | | | 60 | More than 168 | 64 |
| 3 | Soya Bean | 100 | 105 | 4.7 | 0.12 | 0.01 | 0.2 | 68 | 30 |
| 4 | do | 100 | 115 | 2.2 | 0.04 | 0.005 | 1.5 | 168 | 64 |
| 5 | do | 100 | 106 | 0.00 | 0.009 | 0.00 | 1 | 140 | 50 |
| 6 | do | 100 | 117 | 0.00 | 0.00 | 0.00 | 18 | More than 168 | 116 |
| 7 | {Cottonseed / Soya Bean} | 50 / 50 | 114 / 105 | 4.7 | 0.12 | 0.01 | 1 | 44 | 20 |
| 8 | {Cottonseed / Soya Bean} | 50 / 50 | 114 / 115 | 2.2 | 0.04 | 0.005 | 7 | 100 | 40 |
| 9 | {Cottonseed / Soya Bean} | 50 / 50 | 112 / 106 | 0.00 | 0.009 | 0.00 | 2 | 90 | 35 |
| 10 | {Cottonseed / Soya Bean} | 50 / 50 | 113 / 117 | 0.00 | 0.00 | 0.00 | 36 | More than 168 | 110 |
| 11 | {Cottonseed / Soya Bean} | 50 / 50 | 114 / 111 | 0.00 | 0.00 | 0.00 | 14 | 145 | 60 |
| 12 | {Cottonseed / Soya Bean} | 25 / 75 | 113 / 115 | 2.2 | 0.04 | 0.005 | 3 | 120 | 55 |
| 13 | {Cottonseed / Soya Bean} | 75 / 25 | 113 / 115 | 2.2 | 0.04 | 0.005 | 10 | 60 | 26 |
| 14 | {Sesame / Soya Bean} | 60 / 40 | 112 / 112 | 0.6 | 0.012 | 0.001 | 22 | 160 | 70 |
| 15 | {Cottonseed / Sesame / Soya Bean} | 37.5 / 25.0 / 37.5 | 110 / 114 / 116 | 0.00 | 0.00 | 0.00 | 22 | More than 168 | 84 |
| 16 | {Cottonseed / Sesame / Peanut / Soya Bean} | 25 / 35 / 15 / 25 | 115 / 113 / 92 / 112 | 0.9 | 0.018 | 0.001 | 12 | 80 | 36 |

[1] Number of hours required for first appearance of turbidity, i. e. of solid triglycerides.
[2] Number of hours required for the development of an emulsion break, i. e. separation of oleaginous from aqueous components.

The resistance to emulsion failure is determined by subjecting a plurality of samples of the mayonnaise under test to a low temperature (in these tests the samples were run at two temperatures, 23–27° F., an average of 25° F., and 13–17° F., an average of 15° F.), withdrawing one of the samples at intervals from the low temperature holding cabinet, raising the withdrawn sample to room temperature, and observing whether a definite break between the oleaginous and aqueous component occurs. The minimum time required to effect such an emulsion break is the value appearing in the last two columns of Table II.

The first two examples in Table II demonstrate for reference purposes the emulsion stability of mayonnaise made with either cottonseed oil or corn oil as the sole oil component. It will be noted that the corn oil mayonnaise is far superior to the cottonseed oil mayonnaise in emulsion stability. This observation is confirmatory of the teachings of oil technologists that corn oil is the preferred oil in the manufacture of mayonnaise during the winter months. Mayonnaise Examples 3–6 cover products made with soya bean oils described in the co-pending applications cited earlier in this specification. The results with these oils show that any one of them is far superior to the mayonnaise made with cottonseed oil in resistance to oil separation on freezing. These results were totally unexpected in view of the low cold test values for the oils, particularly those in Examples 3-5. Such low cold test figures would lead an oil technologist to dismiss from consideration use of such oils in the manufacture of mayonnaise.

Mayonnaise Examples 7-11 cover products made with salad oils of this invention. It will be noted that all of these samples are far superior to cottonseed oil mayonnaise in resistance to an emulsion break following low temperature exposure. As the concentration of conjugated fatty acids in the hydrogenated winterized soya bean oil of a given iodine number decreases, greater emulsion stability is obtained. Also, in the case of those oil blends containing hydrogenated winterized soya bean oil of the same content of conjugated fatty acids, but differing in iodine value, improvement in emulsion stability is obtained with the higher iodine value. Whereas the cold tests on the oil blends are of no value in predicting the freeze resistance of the mayonnaise when compared with mayonnaise products made with other types of oils, there is a good correlation between emulsion stability and cold test values of oil blends of this invention, when the same component oils are blended in the same ratio. This point is further emphasized by Mayonnaise Examples 12 and 13. Here the two basic oils are present in a 25:75 ratio; in one example, the cottonseed oil is the minor component, in the other example, the hydrogenated winterized soya bean oil is the minor component. It will be noted that whereas both products are far superior in freeze resistance to cottonseed oil mayonnaise, there is no correlation between results for the mayonnaise products with the cold test values for the oil blends. The mayonnaise example containing the higher proportion of soya bean oil in the oil blend is the superior product in emulsion stability. Decreasing the soya bean oil component to a concentration less than 25% of the oil blend brings the product too close in performance to that of Mayonnaise Example 1 made with cottonseed oil as the sole oil component; such oil blends are of very little value for mayonnaise manufacture, shipping and storage during the winter months. Thus, we have discovered that when the salad oil compositions according to our invention contain 25% or more of the hydrogenated winterized soya bean oil of our copending application S. N. 216,100, there is obtained a composition giving unexpected emulsion stability.

Mayonnaise Examples 14-16 show that when vegetable salad oils, other than cottonseed oil but also having an iodine value of less than 120, are blended with hydrogenated winterized soya bean oil having an iodine value of 100 to 120, highly satisfactory values for emulsion stability are obtained.

The scorings in the cold tests on the salad oil examples and in the freeze tests on the mayonnaise examples covered in Tables I and II were objective and reproducible. The results depicted are representative of hundreds of samples which were subjected to the tests. Only illustrative data shown in Tables I and II have been presented for sake of brevity. They cover adequately the performance of the salad oils of this invention in satisfying one of the two basic requirements of a quality salad oil to be marketed as such or to be used in the manufacture of quality mayonnaise, the requirement being maintenance of the original physical state of the products despite low temperature storage.

The second important requirement of a quality salad oil or of a quality mayonnaise prepared therewith is flavor stability. Flavor scorings were formerly characterized as subjective, since no objective physical or chemical methods are available for this purpose. The importance of flavor to food technologists has necessitated a reappraisal of flavor scoring techniques, with the goal that these be converted to an objective basis. This has led to the development of expert and consumer panels for blind flavor scorings of food products. The results of such tests lend themselves to statistical interpretation with conclusions which are truly objective, despite the use of subjective tool-taste impressions. In the present investigation, objective techniques and interpretations of flavor scorings were applied in evaluating both the salad oils and mayonnaise products of this invention versus the customary salad oils and mayonnaise products regarded hitherto as acceptable when used on a seasonal basis.

The following procedure was used for determining flavor stability of the salad oils and the resulting mayonnaise products. The samples under test were coded and flavored by an expert panel of 8 judges when the samples were fresh and after periodic storage at an elevated temperature of 95° F. and at room temperature of 75° F. Numerical values were assigned to the flavor ratings (5=good; down to 1=very poor), and the average score for the product was plotted periodically on a graph versus the length of storage at each of the temperatures indicated above. From these graphs values were obtained for the test samples covering the two important criteria of flavor stability. Figures for shelf life were obtained representing the number of weeks the samples, at each of the specified temperatures, were scored by the panel as being "fair" or above in flavor. The overall flavor acceptability of each of the test samples was obtained by measuring the area under the curve above the "fair" level. Two products may have the same shelf life but differ appreciably in overall flavor acceptability, and as a corollary, two products may have the same overall flavor acceptability but differ in shelf life.

A statistical analysis of the average flavor ratings of two samples at a given time indicated that a difference of 1.0 unit in score was required for significance, probability of 0.05, i. e. 95 chances out of 100 that the difference noted between the average flavor ratings of a pair of samples was real. However, inasmuch as each stability study involved flavor scorings on the fresh samples, 6 weekly scorings of those held at 95° F., and 6 bi-weekly scorings of the samples held at 75° F., it was found not necessary to obtain at each scoring a difference of one full unit between two samples in a pair for a statistical significance. As the samples aged, the panel of expert judges progressively scored the products lower in the acceptability scale. Even small differences between products, of the order of 0.25 unit, were uniformly maintained week after week to a surprising degree, viz. six out of the seven scoring tests at a given holding temperature. Under such circumstances, a difference of as little as 0.25 unit between two samples in a flavor stability evaluation was statistically significant at a probability level of 0.05 (95 chances out of 100).

More than 80 samples, covering more than 8000 flavor scorings by the expert 8 judges were used in the present investigation. Two consumer surveys, each comprising about 100 housewives, were conducted to check on the reliability of the expert panel in predicting consumer preference. In one consumer survey, mayonnaise made with winterized corn oil as the sole oil component was used as the reference point in evaluating the flavor stability of the mayonnaise prepared with an oil blend covered in this invention. In the other survey, the reference oil was winterized cottonseed oil. The latter survey also covered scorings by the consumer panel of mayonnaise after 1, 2, 3 and 4 months of storage at uncontrolled temperatures blanketing the summer months. Concomitant scorings of the same samples always under code by the expert panel were also made. It was found in these associated scoring studies that the consumer panel had the same preferences as shown in the tests conducted with the expert panel, even though the average consumer tolerated to a greater degree flavor deterioration in the two products submitted at one time for evaluation. Thus, the average expert was found to score the test products below "fair" in one-third the time required by the average consumer. We, therefore, emphasize that the conclusions on flavor drawn from expert panel scorings in the present investigation are valid in reflecting consumer reactions. The more critical scoring by experts is definitely desirable since wide scattering of individual scorings among a consumer panel occurs; an average score of better than "fair" by a consumer panel can be cause for concern to the manufacturer if a significant number, viz. 20 percent, score the product as "poor." The latter was actually noted in the consumer response following the evaluation of the test and reference mayonnaise samples held 4 months at prevailing summer temperatures.

In Table III are presented a number of mayonnaise examples, No. 7-16, illustrating the synergistic flavor improvement of mayonnaise made with hydrogenated winterized soya bean oil having an iodine value of 100 to 120 when blended with vegetable salad oils having an iodine value of less than 120. For a better appreciation of the flavor improvement noted, the results obtained with 4 mayonnaise examples, No. 1-4, are included. The mayonnaise examples, identified by number in Table III, are the same as those of the same number in Table II, so that there is no need to repeat the conjugated fatty acid composition of the soya bean oil fractions. Listed are the shelf lives of each of the mayonnaise examples when stored at 95° F. and at 75° F.; these represent the number of weeks during which the product scored "fair" or above with the panel of experts. Overall acceptabilities of the mayonnaise during the period of satisfactory shelf life at 95° F. and at 75° F. are also listed; these are represented by the areas under the curves plotting degree of acceptability, during which the products scored "fair" or above, versus time. Assigning a flavor score of 100 to each of the performances of the mayonnaise made with the cottonseed salad oil as the sole oil component, an average value for the four categories of flavor performance in the case of each of the other samples was obtained. In this way, it was possible to obtain one figure covering the flavor performance of each product under realistic storage conditions simulating those found in retail outlets. Table III follows:

TABLE III

*Synergistic flavor improvement of mayonnaise made with hydrogenated winterized soya bean oil having an iodine value of 100–120 when blended with vegetable salad oils having an iodine value of less than 120*

| Mayonnaise Example | Salad Oil Component | Blend | Iodine Value | Shelf Life [1] (Weeks) | | Overall Acceptability [2] | | Relative Flavor Acceptability [3] |
|---|---|---|---|---|---|---|---|---|
| | | | | at 95° F. | at 75° F. | at 95° F. | at 75° F. | |
| | | Percent | | Weeks | Weeks | sq. mm. | sq. mm. | Percent |
| 1 | Cottonseed | 100 | 113 | 6 | 10 | 365 | 675 | 100 |
| 2 | Corn | 100 | 127 | 1½ | 4½ | 140 | 275 | 36 |
| 3 | Soya Bean | 100 | 105 | 4 | 5 | 175 | 400 | 56 |
| 4 | Soya Bean | 100 | 115 | 4 | 5 | 165 | 375 | 55 |
| 7 | Cottonseed | 50 | 114 | 5 | 12 | 465 | 1,250 | 129 |
|  | Soya Bean | 50 | 105 | | | | | |
| 8 | Cottonseed | 50 | 114 | 5 | 10 | 465 | 900 | 111 |
|  | Soya Bean | 50 | 115 | | | | | |
| 11 | Cottonseed | 50 | 114 | 5 | 12 | 410 | 1,050 | 118 |
|  | Soya Bean | 50 | 111 | | | | | |
| 12 | Cottonseed | 25 | 113 | 5 | 8½ | 300 | 600 | 85 |
|  | Soya Bean | 75 | 115 | | | | | |
| 13 | Cottonseed | 75 | 113 | 6 | 12 | 350 | 650 | 103 |
|  | Soya Bean | 25 | 115 | | | | | |
| 14 | Sesame | 60 | 112 | 6 | 12 | 390 | 900 | 115 |
|  | Soya Bean | 40 | 112 | | | | | |
| 15 | Cottonseed | 37.5 | 110 | 6 | 12 | 380 | 825 | 112 |
|  | Sesame | 25.0 | 114 | | | | | |
|  | Soya Bean | 37.5 | 116 | | | | | |
| 16 | Cottonseed | 25 | 115 | 6 | 12 | 350 | 710 | 105 |
|  | Sesame | 35 | 113 | | | | | |
|  | Peanut | 15 | 92 | | | | | |
|  | Soya Bean | 25 | 112 | | | | | |

[1] Number of weeks during which the product scored "fair" or above.
[2] Shelf life × degree of acceptability; area obtained from graphs on which were plotted the scorings week after week.
[3] Assigning a flavor score of 100 to each of the performances of the mayonnaise made with cottonseed salad oil as the sole component, and calculating an average value for the four categories of flavor performance in the case of each of the other samples.

The values for cottonseed oil mayonnaise (Example No. 1) represent what is generally regarded as the best obtainable up to the present time in the manufacture of a quality product. The poorer values with corn oil mayonnaise (Example No. 2) indicate the sacrifice a manufacturer must be willing to make in the flavor stability of his mayonnaise product during the winter months in order to obtain satisfactory freeze resistance. Significant improvement in flavor stability over corn oil mayonnaise is obtained, when the mayonnaise (Example No. 3 or No. 4) is made with the hydrogenated winterized soya bean oils of our co-pending applications, supra. However, these products are inferior in flavor performance to a quality mayonnaise made with cottonseed oil. It will be noted that most of the hydrogenated winterized soya bean oils listed in Table III are those characterized by the higher concentrations of conjugated fatty acids. For the sake of brevity, only a few hydrogenated winterized soya bean oils containing the very small concentrations of conjugated fatty acids were included in this tabulation since these routinely are at least equal in flavor performance to those containing the higher concentrations of conjugated fatty acids.

It is the general opinion of oil technologists that when an oil of poorer flavor stability is blended with an oil of better flavor stability, the resulting blend, whether used as such or in mayonnaise manufacture, will have a flavor life characteristic of the poorer oil in the blend. Thus, past attempts have shown that the addition of unhydrogenated freshly-deodorized soya bean oil in very small concentrations, viz. 5 to 10%, to a quality cottonseed salad oil gives a mayonnaise unacceptable in flavor life. Contrary to the teachings of oil technologists and contrary to our own past experiences, we have now discovered that blending the hydrogenated winterized soya bean oil having an iodine value of 100–120 with vegetable salad oils having an iodine value of less than 120 yields mayonnaise characterized by extraordinary good shelf life. Thus, with the 50:50 blends of the hydrogenated winterized soya bean oil with the cottonseed salad oil, Examples 7–11, the flavor stability of the resulting mayonnaise products was not similar to that of mayonnaise made with the soya bean oil fraction alone (Examples 3 and 4) but even superior to that obtained with the mayonnaise made with the cottonseed oil as the sole oil component (Example 1). When one oil is present in the ratio of 25:75 to the other (Examples 12 and 13), the flavor performance is still good, comparable to that of the quality cottonseed oil mayonnaise. The preferred ratio of one oil to the other is as 60 is to 40 (viz. Example 14). Examples 14–16 show the flavor performance in mayonnaise of oil blends of the invention which include vegetable salad oils other than cottonseed oil but also having an iodine value of less than 120.

The examples in Table III cover specific mayonnaise products evaluated in the course of the investigation which resulted in the present invention. Actually, 60 different products of the more important type were evaluated with 104 flavor scorings on each sample by the expert 8 judges, 8 on the fresh product, 48 during the 95° F. holding period and 48 during the 75° F. holding period.

In Table IV is a statistical evaluation of the overall flavor acceptability of the more important mayonnaise products of this invention. For reference purposes, the results obtained with mayonnaise products made with a single oil component, cottonseed salad oil, corn salad oil, or the hydrogenated soya bean oils of our co-pending patent application (supra) are included. For the sake of brevity, the performance of samples held only at 75° F. are given. In Table IV are listed the average values for overall flavor acceptability, the standard deviations and the latter expressed on a percentage basis (frequently called the coefficient of variation). In addition, a "$t$" value reflecting the significance of the difference in flavor performance between any two types of mayonnaise products was calculated. The "$t$" value is the difference between the mean values obtained divided by the standard error of the difference between the means. On the bottom of Table IV is shown a comparison of the average flavor performance of one type of mayonnaise product versus the average performance of another type of product. The found "$t$" values and found probabilities are listed. A probability of .05 means that there are 95 chances out of 100 that the difference between means is real. Statisticians universally hold that this probability must be attained before the found difference can be regarded as significant. A probability value of .01 means that the observed difference is likely to be noted in 99 times out of 100 and is highly significant. That the found "$t$" values reflect a certain probability that the difference between one type of mayonnaise product and another is real, is established by comparing these found "$t$" values with the significant "$t$" values for a given probability taken from statistical tables. The significant "$t$" values and corresponding probabilities listed in Table IV are those for a specific number of tests on the samples in the pair under comparison, i. e. based upon the number of degrees of freedom.

It will be noted that mayonnaise made with cottonseed oil as the sole oil component (product type A) is definitely superior to mayonnaise made with either the corn oil (product type B) or the hydrogenated winterized soya bean oil having an iodine value of 100–120 (product type C). However, mayonnaise made with salad oils of this invention, wherein the soya bean oil fraction has an iodine value of 100–110 (product type D) is definitely superior in flavor performance to mayonnaise made with cottonseed oil as the sole oil component (product type A). Mayonnaise with this type of salad oil is even superior in flavor performance to that noted when hydrogenated winterized soya bean oil having an iodine value of 110–120 (product type E) is used to prepare the mayonnaise products of this invention. When the latter type oil blend is employed, the superiority of the resulting mayonnaise (product type E) over one made with cottonseed salad oil as the sole oil component (product type A) borders on statistical significance. Such mayonnaise (product type E), however, is definitely superior to mayonnaise made with either corn oil (product type B) or hydrogenated winterized soya bean oil having an iodine value of 100–120 (product type C) as the sole oil component.

With respect to other properties required in a quality mayonnaise—such as satisfactory color, desirable firmness, and ability to absorb added aqueous materials without an emulsion break—the said oils of this invention are equal to those of mayonnaise made with either cottonseed salad oil or corn oil as the sole oil component.

TABLE IV

*Statistical evaluation of overall flavor acceptability of mayonnaise samples [1] made with vegetable salad oil having an iodine value of less than 120 and/or with hydrogenated winterized soya bean oil having an iodine value of 100–120*

| Product Type | Winterized Oil in Mayonnaise | Blend | Iodine Value | Average Overall Flavor Acceptability [2] | | |
|---|---|---|---|---|---|---|
| | | | | Value from Graph | Standard— Absolute | Deviation— Percentage |
| | | Percent | | sq. mm. | | |
| A | Cottonseed | 100 | 110–116 | 670 | 17 | 2.5 |
| B | Corn | 100 | 125–128 | 351 | 177 | 50.5 |
| C | Soya Bean | 100 | 100–120 | 400 | 18 | 4.5 |
| D | {Cottonseed | 50 | 110–116 | 1,110 | 210 | 18.9 |
| | {Soya Bean | 50 | 100–110 | | | |
| E | {Cottonseed | 50 | 110–116 | 860 | 170 | 19.8 |
| | {Soya Bean | 50 | 110–120 | | | |

| Comparisons | "t" Found Value | Found Probability | Significant "t" Value [3] | Corresponding Probability [3] |
|---|---|---|---|---|
| A better than B | 4.00 | .01–.001 | 2.977 | .01 |
| | | | 4.140 | .001 |
| A better than C | 23.5 | .001 | 4.140 | .001 |
| C better than B | 0.6 | .6–.5 | Not significant | Not significant |
| D better than A | 4.2 | .01–.001 | 3.055 | .01 |
| | | | 4.318 | .001 |
| D better than B | 5.8 | .001 | 4.140 | .001 |
| D better than C | 6.8 | .001 | 4.140 | .001 |
| D better than E | 2.3 | .05–.02 | 2.048 | .05 |
| | | | 2.467 | .02 |
| E better than A | 2.0 | .1–.05 | 1.701 | .1 |
| | | | 2.048 | .05 |
| E better than B | 5.5 | .001 | 3.646 | .001 |
| E better than C | 10.0 | .001 | 3.646 | .001 |

[1] Sixty different samples, with 56 flavor scorings on each sample by the eight judges at the bi-weekly observation periods during the over-all test period of 12 weeks, were involved in this portion of the study.
[2] Shelf life × degree of acceptability of samples held at 75° F.; areas obtained from graphs on which were plotted the scorings week after week.
[3] From Statistical Tables for Biological, Agricultural and Medical Research by Fisher, R. A., and Yates, F.; Hafner Publishing Co., N. Y. (1949).

While the soya bean oil blends of this invention have been described with particular reference to their use as a salad oil to be marketed as such or to be used in mayonnaise, these descriptions are illustrative and are not to be construed as a limitation of the invention. Such soya bean oil blends may be used for numerous other purposes, such as a component in other salad dressings, or the liquid fraction of a compounded shortening or margarine oil, or wherever a liquid vegetable oil of good stability is required.

The flavor life of the oil blends of this invention may be improved for certain purposes by incorporating in them a monoester of citric acid as described in U. S. Patent 2,485,631 and 2,485,633 granted on October 25, 1949 to The Best Foods, Inc., as assignee of H. W. Vahlteich, C. M. Gooding and R. H. Neal.

In accordance with the term as used in this application, "vegetable salad oil" is intended to include a salad oil of a glyceridic ester of a fatty acid, derived from vegetable sources having an iodine number of less than 120 and having a history of satisfactory usage in mayonnaise manufacture. Preferred oils are winterized cottonseed oil, peanut oil and sesame oil.

It is intended, in accordance with the invention, that the hydrogenated winterized soyabean oil with prescribed properties make up at least 25% of the glyceridic salad oil content of the composition. The remainder of the glyceridic salad oil content is made up of vegetable salad oil of iodine number less than 120. The vegetable salad oil may be incorporated as a mixture of vegetable salad oils from more than a single vegetable source.

Our invention provides a novel salad oil composition imparting superior emulsion stability to mayonnaise. The novel salad oil and mayonnaise prepared from this salad oil have improved flavor characteristics and stability. The firmness and texture of mayonnaise containing the salad oil composition of the invention is of optimum quality. This mayonnaise also possesses the ability to absorb added aqueous components without disturbing the emulsion characteristics of the mayonnaise.

The terms and expressions which we have employed are used as terms of description and not limitation, and we have no intention in the use of such terms and expressions of excluding any equivalents of the features shown and described or portions thereof, but recognize that various modifications are possible within the scope of the invention claimed.

What is claimed is:

1. An edible glyceridic oil composition comprising a vegetable salad oil having an iodine number of less than 120 and a hydrogenated and winterized soya bean oil having an iodine number of 100 to 120 and containing less than 5% of conjugated dienoic acid components, less than 0.2% of conjugated trienoic acid components and less than 0.02% of conjugated tetraenoic acid components.

2. An edible glyceridic oil composition comprising 25 to 75% of a vegetable salad oil having an iodine number of less than 120 and 25 to 75% of a hydrogenated and winterized soya bean oil having an iodine number of 100 to 120 and containing less than 5% of conjugated dienoic acid components, less than 0.2% of conjugated trienoic acid components and less than 0.02% of conjugated tetraenoic acid components.

3. An edible glyceridic oil composition comprising 40 to 60% of a vegetable salad oil having an iodine number of less than 120 and 40 to 60% of a hydrogenated and winterized soya bean oil having an iodine number of 100 to 120 and containing less than 5% of conjugated dienoic acid components, less than 0.2% of conjugated trienoic acid components and less than 0.02% of conjugated tetraenoic acid components.

4. An edible glyceridic oil composition comprising about 50% of a vegetable salad oil having an iodine number of less than 120 and about 50% of a hydrogenated and winterized soya bean oil having an iodine number of 100 to 120 and containing less than 5% of conjugated dienoic acid components, less than 0.2% of conjugated trienoic acid components, and less than 0.02% of conjugated tetraenoic acid components.

5. An edible glyceridic oil composition comprising 25 to 75% of a vegetable salad oil having an iodine value of less than 120 and 25 to 75% of a hydrogenated and winterized soya bean oil having an iodine number of 110 to 120 and containing less than 3½% of conjugated dienoic acid components, less than 0.1% of conjugated trienoic acid components and less than 0.015% of conjugated tetraenoic acid components.

6. An edible glyceridic oil composition comprising 40 to 60% of a vegetable salad oil having an iodine value of less than 120 and 40 to 60% of a hydrogenated and winterized soya bean oil having an iodine number of 110 to 120 and containing less than 3½% of conjugated dienoic acid components, less than 0.1% of conjugated trienoic acid components and less than 0.015% of conjugated tetraenoic acid components.

7. An edible glyceridic oil composition comprising about 50% of a vegetable salad oil having an iodine value of less than 120 and about 50% of a hydrogenated and winterized soya bean oil having an iodine number of 110 to 120 and containing less than 3½% of conjugated dienoic acid components, less than 0.1% of conjugated trienoic acid components, and less than 0.015% of conjugated tetraenoic acid components.

8. An edible glyceridic oil composition comprising 25 to 75% of a vegetable salad oil having an iodine number of less than 120 and 25 to 75% of a hydrogenated and winterized soya bean oil having an iodine number of 100 to 120 and containing less than 1% of conjugated dienoic acid components, less than 0.02% of conjugated trienoic acid components and less than 0.002% of conjugated tetraenoic acid components.

9. An edible glyceridic oil composition comprising 40 to 60% of a vegetable salad oil having an iodine number of less than 120 and 40 to 60% of a hydrogenated and winterized soya bean oil having an iodine number of 100 to 120 and containing less than 1% of conjugated dienoic acid components, less than 0.02% of conjugated trienoic acid components and less than 0.002% of conjugated tetraenoic acid components.

10. An edible glyceridic oil composition comprising about 50% of a vegetable salad oil having an iodine number of less than 120 and about 50% of a hydrogenated and winterized soya bean oil having an iodine number of 100 to 120 and containing less than 1% of conjugated dienoic acid components, less than 0.02% of conjugated trienoic acid components, and less than 0.002% of conjugated tetraenoic acid components.

11. An edible glyceridic oil composition comprising 25 to 75% of a vegetable salad oil having an iodine value of less than 120 and a hydrogenated and winterized soya bean oil having an iodine number of 110 to 120 and containing less than 0.8% of conjugated dienoic acid components, less than 0.015% of conjugated trienoic acid components and less than 0.002% of conjugated tetraenoic acid components.

12. An edible glyceridic oil composition comprising 40 to 60% of a vegetable salad oil having an iodine value of less than 120 and a hydrogenated and winterized soya bean oil having an iodine number of 110 to 120 and containing less than 0.8% of conjugated dienoic acid components, less than 0.015% of conjugated trienoic acid components and less than 0.002% of conjugated tetraenoic acid components.

13. An edible glyceridic oil composition comprising about 50% of a vegetable salad oil having an iodine value of less than 120 and a hydrogenated and winterized soya bean oil having an iodine number of 110 to 120 and containing less than 0.8% of conjugated dienoic acid components, less than 0.015% of conjugated trienoic acid components, and less than 0.002% of conjugated tetraenoic acid components.

14. An edible glyceridic oil composition comprising about 50% of a cottonseed salad oil having an iodine number of less than 120 and about 50% of a hydrogenated and winterized soya bean oil having an iodine number of 100 to 120 and containing less than 5% of conjugated dienoic acid components, less than 0.2% of conjugated trienoic acid components and less than 0.02% of conjugated tetraenoic acid components.

15. An edible glyceridic oil composition comprising 50% of a cottonseed salad oil having an iodine number of less than 120 and 50% of a hydrogenated and winterized soya bean oil having an iodine number of 110 to 120 and containing less than 1% of conjugated dienoic acid components, less than 0.02% of conjugated trienoic acid components, and less than 0.002% of conjugated tetraenoic acid components.

16. A mayonnaise comprising vinegar, eggs, salt, and a glyceridic oil composition comprising a vegetable salad oil having an iodine value of less than 120 and a hydrogenated and winterized soya bean oil having an iodine number of 100 to 120 and containing less than 5% of conjugated dienoic acid components, less than 0.2% of conjugated trienoic acid components, and less than 0.02% of conjugated tetraenoic acid components.

17. A mayonnaise comprising vinegar, eggs, salt and a glyceridic oil composition comprising 25 to 75% of a vegetable salad oil having an iodine value of less than 120 and 25 to 75% of a hydrogenated and winterized soya bean oil having an iodine number of 100 to 120 and containing less than 5% of conjugated dienoic acid components, less than 0.2% of conjugated trienoic acid components and less than 0.02% of conjugated tetraenoic acid components.

18. A mayonnaise comprising vinegar, eggs, salt and a glyceridic oil composition comprising 40 to 60% of a vegetable salad oil having an iodine value of less than 120 and 40 to 60% of a hydrogenated and winterized soya bean oil having an iodine number of 100 to 120 and containing less than 5% of conjugated dienoic acid components, less than 0.2% of conjugated trienoic acid components and less than 0.02% of conjugated tetraenoic acid components.

19. A mayonnaise comprising vinegar, eggs, salt, and a glyceridic oil composition comprising about 50% of a vegetable salad oil having an iodine value of less than 120 and about 50% of a hydrogenated and winterized soya bean oil having an iodine number of 100 to 120 and containing less than 5% of conjugated dienoic acid components, less than 0.2% of conjugated trienoic acid components, and less than 0.02% of conjugated tetraenoic acid components.

20. A mayonnaise comprising vinegar, eggs, salt and a glyceridic oil composition comprising 25 to 75% of a vegetable salad oil having an iodine value of less than 120 and 25 to 75% of a hydrogenated and winterized soya bean oil having an iodine number of 110 to 120 and containing less than 3½% of conjugated dienoic acid components, less than 0.1% of conjugated trienoic acid components and less than 0.015% of conjugated tetraenoic acid components.

21. A mayonnaise comprising vinegar, eggs, salt and a glyceridic oil composition comprising 40 to 60% of a vegetable salad oil having an iodine value of less than 120 and 40 to 60% of a hydrogenated and winterized soya bean oil having an iodine number of 110 to 120 and containing less than 3½% of conjugated dienoic acid components, less than 0.1% of conjugated trienoic acid components and less than 0.015% of conjugated tetraenoic acid components.

22. A mayonnaise comprising vinegar, eggs, salt, and a glyceridic oil composition comprising about 50% of a vegetable salad oil having an iodine value of less than 120 and about 50% of a hydrogenated and winterized soya bean oil having an iodine number of 110 to 120 and containing less than 3½% of conjugated dienoic acid components, less than 0.1% of conjugated trienoic acid components, and less than 0.015% of conjugated tetraenoic acid components.

23. A mayonnaise comprising vinegar, eggs, salt and a glyceridic oil composition comprising 25 to 75% of a vegetable salad oil having an iodine value of less than 120 and 25 to 75% of a hydrogenated and winterized soya bean oil having an iodine number of 100 to 120 and containing less than 1% of conjugated dienoic acid components, less than 0.02% of conjugated trienoic acid components and less than 0.002% of conjugated tetraenoic acid components.

24. A mayonnaise comprising vinegar, eggs, salt and a glyceridic oil composition comprising 40 to 60% of a vegetable salad oil having an iodine value of less than 120 and 40 to 60% of a hydrogenated and winterized soya bean oil having an iodine number of 100 to 120 and containing less than 1% of conjugated dienoic acid components, less than 0.02% of conjugated trienoic acid components and less than 0.002% of conjugated tetraenoic acid components.

25. A mayonnaise comprising vinegar, eggs, salt, and a glyceridic oil composition comprising about 50% of a vegetable salad oil having an iodine value of less than 120 and about 50% of a hydrogenated and winterized soya bean oil having an iodine number of 100 to 120 and containing less than 1% of conjugated dienoic acid components, less than 0.02% of conjugated trienoic acid components, and less than 0.002% of conjugated tetraenoic acid components.

26. A mayonnaise comprising vinegar, eggs, salt and a glyceridic oil composition comprising 25 to 75% of a vegetable salad oil having an iodine value of less than 120 and 25 to 75% of a hydrogenated and winterized soya bean oil having an iodine number of 110 to 120 and containing less than 0.8% of conjugated dienoic acid components, less than 0.015% of conjugated trienoic acid components and less than 0.002% of conjugated tetraenoic acid components.

27. A mayonnaise comprising vinegar, eggs, salt and a glyceridic oil composition comprising 40 to 60% of a vegetable salad oil having an iodine value of less than 120 and 40 to 60% of a hydrogenated and winterized soya bean oil having an iodine number of 110 to 120 and containing less than 0.8% of conjugated dienoic acid components, less than 0.015% of conjugated trienoic acid components and less than 0.002% of conjugated tetraenoic acid components.

28. A mayonnaise comprising vinegar, eggs, salt and a glyceridic oil composition comprising about 50% of a cottonseed salad oil having an iodine value of less than 120 and about 50% of a hydrogenated and winterized soya bean oil having an iodine number of 100 to 120 and containing less than 5% of conjugated dienoic acid components, less than 0.2% of conjugated trienoic acid components and less than 0.02% of conjugated tetraenoic acid components.

29. A mayonnaise comprising vinegar, eggs, salt, and a glyceridic oil composition comprising about 50% of a vegetable salad oil having an iodine value of less than 120 and about 50% of a hydrogenated and winterized soya bean oil having an iodine number of 110 to 120 and containing less than 0.8% of conjugated dienoic acid components, less than 0.015% of conjugated trienoic acid components, and less than 0.002% of conjugated tetraenoic acid components.

DANIEL MELNICK.
CHESTER M. GOODING.
HANS W. VAHLTEICH.

REFERENCES CITED

The following references are of record in the file of this patent:

UNITED STATES PATENTS

| Number | Name | Date |
|---|---|---|
| 2,136,653 | Moore et al. | Nov. 15, 1938 |
| 2,293,729 | Gudheim | Aug. 25, 1942 |
| 2,353,229 | Durkee | July 11, 1944 |